United States Patent
Kim et al.

(10) Patent No.: US 11,477,648 B2
(45) Date of Patent: Oct. 18, 2022

(54) V2X COMMUNICATION DEVICE AUTENTICATION TOKEN IN DISCOVERY RESPONSE MESSAGE AND DATA COMMUNICATION METHOD THEREOF

(71) Applicant: LG Electronics Inc., Seoul (KR)

(72) Inventors: Soyoung Kim, Seoul (KR); Yongpyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 16/611,062

(22) PCT Filed: Apr. 21, 2017

(86) PCT No.: PCT/KR2017/004292
§ 371 (c)(1),
(2) Date: Nov. 5, 2019

(87) PCT Pub. No.: WO2018/194202
PCT Pub. Date: Oct. 25, 2018

(65) Prior Publication Data
US 2020/0162908 A1    May 21, 2020

(51) Int. Cl.
| | |
|---|---|
| H04L 9/32 | (2006.01) |
| H04W 12/08 | (2021.01) |
| H04W 4/40 | (2018.01) |
| H04L 9/40 | (2022.01) |
| H04W 8/00 | (2009.01) |
| H04W 12/069 | (2021.01) |

(52) U.S. Cl.
CPC ......... *H04W 12/08* (2013.01); *H04L 63/0853* (2013.01); *H04W 4/40* (2018.02); *H04W 8/005* (2013.01); *H04W 12/069* (2021.01)

(58) Field of Classification Search
CPC ..... H04W 12/08; H04W 4/40; H04W 12/069; H04W 63/0853; H04W 8/005
USPC ............................................................ 726/9
See application file for complete search history.

(56) References Cited

U.S. PATENT DOCUMENTS

| | | | |
|---|---|---|---|
| 8,010,783 B1 * | 8/2011 | Cahill ..................... | H04L 63/10 713/155 |
| 9,882,958 B1 * | 1/2018 | Crosbie .................. | H04L 67/02 |

(Continued)

FOREIGN PATENT DOCUMENTS

| | | |
|---|---|---|
| EP | 2942921 | 11/2015 |
| KR | 10-1584001 | 1/2016 |
| WO | 2015142247 | 9/2015 |

OTHER PUBLICATIONS

Extended European Search Report in European Appln. No. 17906174.2, dated Oct. 20, 2020, 7 pages.

(Continued)

*Primary Examiner* — Haresh N Patel
(74) *Attorney, Agent, or Firm* — Fish & Richardson P.C.

(57) ABSTRACT

Disclosed is a data communication method of a V2X communication device. The data communication method of a V2X communication device comprises the steps of: transmitting a device discovery message; receiving, from an external V2X communication device, a discovery response message for the device discovery message; and performing a security authentication authenticating a second authentication token included in the discovery response message.

17 Claims, 19 Drawing Sheets

(56) References Cited

U.S. PATENT DOCUMENTS

| | | | |
|---|---|---|---|
| 2006/0251115 A1* | 11/2006 | Haque | H04W 84/22 370/466 |
| 2007/0142990 A1* | 6/2007 | Moughler | G07C 5/00 701/50 |
| 2009/0138712 A1* | 5/2009 | Driscoll | H04L 9/12 713/170 |
| 2010/0164693 A1 | 7/2010 | Zhang et al. | |
| 2010/0306547 A1* | 12/2010 | Fallows | G06F 21/31 713/178 |
| 2013/0318570 A1 | 11/2013 | L. et al. | |
| 2014/0056220 A1 | 2/2014 | Poitau et al. | |
| 2014/0247764 A1* | 9/2014 | Kukosa | H04W 52/0225 370/311 |
| 2015/0350867 A1* | 12/2015 | Chaponniere | H04W 40/04 370/254 |
| 2016/0127341 A1* | 5/2016 | Yan | H04L 9/32 726/9 |
| 2016/0212223 A1* | 7/2016 | Yang | H04L 61/2015 |
| 2016/0286400 A1* | 9/2016 | Pal | H04L 9/3213 |
| 2016/0295624 A1* | 10/2016 | Novlan | H04W 72/04 |
| 2017/0093866 A1* | 3/2017 | Ben-Noon | H04L 63/10 |
| 2017/0163806 A1* | 6/2017 | Shanmugam | H04W 12/068 |
| 2017/0288886 A1* | 10/2017 | Atari | H04L 65/1006 |
| 2018/0035276 A1* | 2/2018 | Kang | H04W 48/08 |
| 2018/0115895 A1* | 4/2018 | Lehtovirta | H04W 12/069 |
| 2018/0124186 A1* | 5/2018 | Zanier | H04L 67/147 |
| 2018/0159935 A1* | 6/2018 | Cavalcanti | H04W 4/80 |
| 2018/0295655 A1* | 10/2018 | Cavalcanti | H04W 12/35 |
| 2018/0324564 A1* | 11/2018 | Feng | H04W 48/18 |

OTHER PUBLICATIONS

Intel Corporation, "Authentication of sender UE for V2X broadcast communication," 3GPP TSG-SA WG1 Meeting #70, S1-151089, San Jose Del Cabo, Mexico, Apr. 13-17, 2015, 5 pages.

* cited by examiner

FIG. 11
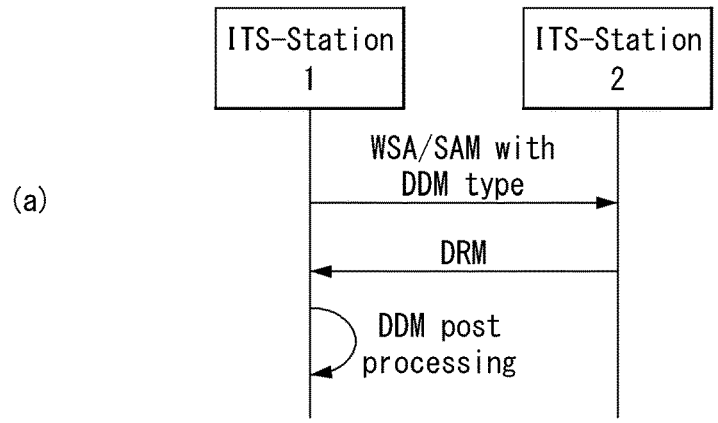
(a)
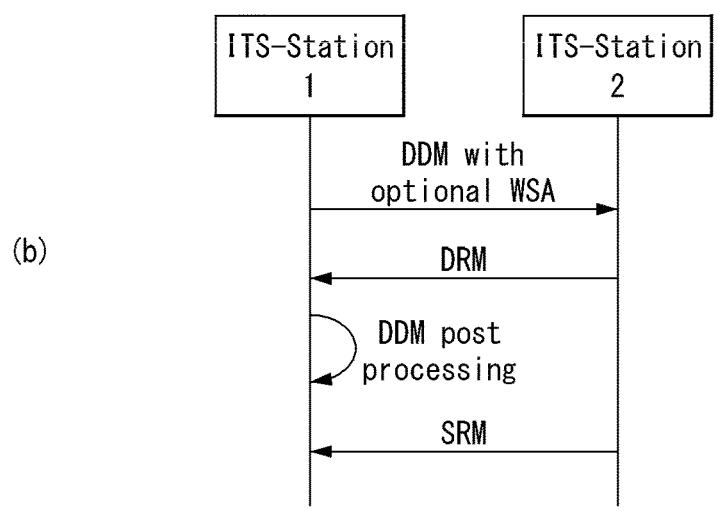
(b)
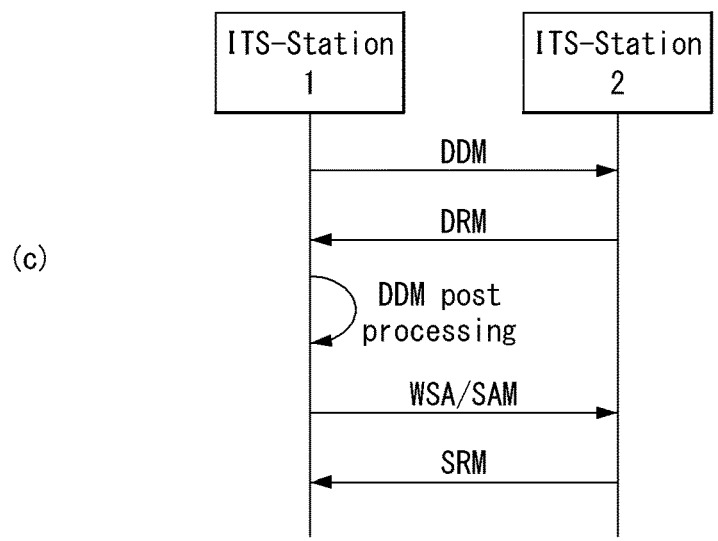
(c)

| ITS-AID / PSID | | | ITS service (application) | Spec |
|---|---|---|---|---|
| Numerical value | unaligned PER of ASN.1 | Size | | |
| 135 = 0x87 | 0p80.07 | 1 | WAVE WSA | IEEE 1609.3 |
| 2.113.664 = 0x20.40.80 | 0pe0.00.00.00 | 4 | Fast Service Advertisement Protocol (FSAP) | ISO 24102-5 |
| 53=0x35 | 0p35 | 1 | DDM/DRM Service | ETSI |
| 54=0x36 | 0p36 | 1 | DDM/DRM Service | IEEE |

FIG. 15

| Name | Description |
|---|---|
| AT | Discoverer Authenticate Token |
| Expiry Time | AT's Expiry Time |
| Reserved | For future use |

(a)

| Name | Description |
|---|---|
| AT | Discovererd Authenticate Token |
| Expiry Time | AT's Expiry Time |
| TC | Device Trust Class( 0 .. n) |
| Nick Name | Nick Name of Device |
| Priority | 0..m |
| Reserved | For future use |

| Name | Description |
|---|---|
| Discovery Type | Discoverer Only |
| | Discover and Service Announcement |
| | Reserved Discovery |
| | One Time Discoveory |
| | Continuously Discovery |
| | Etc. |
| Request Type | Discovery Request Option |
| | 0x0000: default DSRC |
| | 0x0001: GeoNetwork |
| | 0x0002: if DSRC Range Fail then GeoNetwork |
| | 0x0003: Cellular |
| | Etc. |

FIG. 18

| Field name | Description |
|---|---|
| Version | Identifies the version of the GeoNetworking protocol |
| NH | Identifies the type of header immediately following the GeoNetworking Basic Header as specified in table |
| Reserved | For future use |
| LT | Lifetime field. Indicates the maximum tolerable time a packet can be buffered until it reaches its destination<br>Bit 0 to Bit 5: LT sub-field Multiplier<br>Bit 6 to Bit 7: LT sub-field Base<br>Encoded as specified in clause |
| RHL | Decremented by 1 by each GeoAdhoc router that forwards the packet The packet shall not be forwarded if RHL is decremented to zero |

(a)

| Field name | Description |
|---|---|
| NH | Identifies the type of header immediately following the GeoNetworking Basic Header as specified in table |
| Reserved | Reserved. Set to 0 |
| HT | Identifies the type of the GeoNetworking header as specified in table |
| HST | Identifies the sub-type of the GeoNetworking header as specified in table |
| TC | Traffic class that represents Facility-layer requirements on packet transport. Encoding is specified in clause |
| Flags | Bit 0: Indicates whether the ITS-S is mobile or stationary<br>Bit 1 to Bit 7: Reserve, set to 0 |
| PL | Length of the GeoNetworking payload, i.e. the rest of the packet following the whole GeoNetworking header in octets, for example BTP + CAM |
| MHL | Maximum hop limit (see NOTE) |
| Reserved | Reserved. Set to 0 |

(b)

FIG. 19
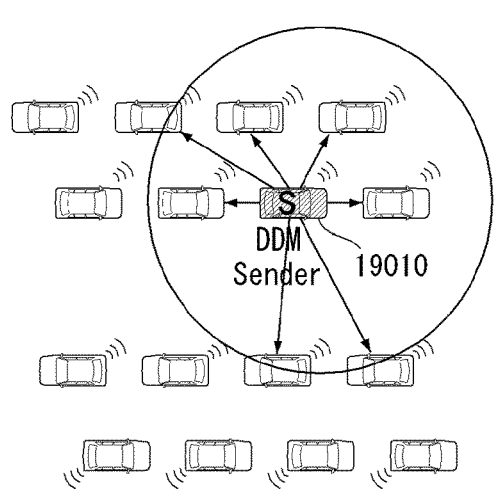
(a)
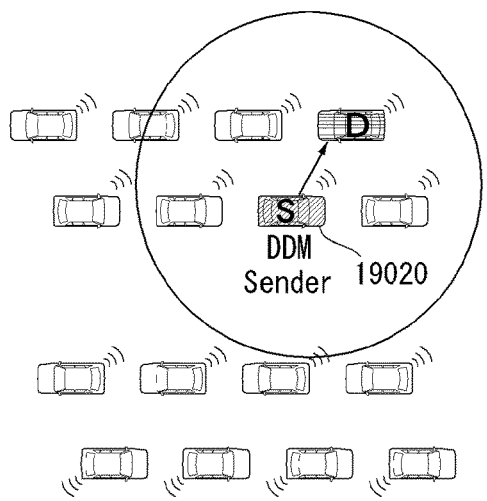
(b)
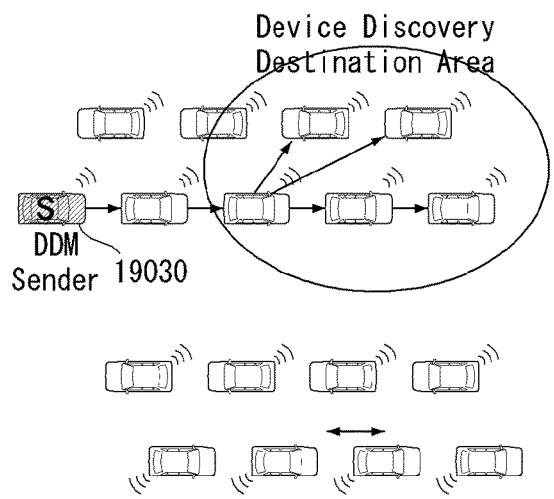
(c)
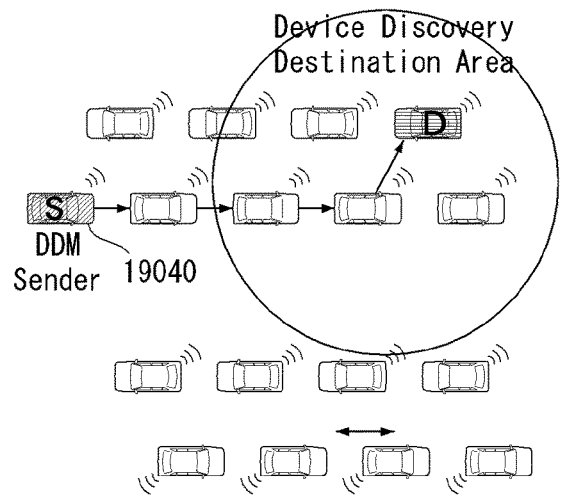
(d)

V2X COMMUNICATION DEVICE AUTENTICATION TOKEN IN DISCOVERY RESPONSE MESSAGE AND DATA COMMUNICATION METHOD THEREOF

CROSS-REFERENCE TO RELATED APPLICATION

This application is a National Stage application under 35 U.S.C. § 371 of International Application No. PCT/KR2017/004292, filed on Apr. 21, 2017, the disclosure of the prior application is incorporated by reference in its entirety.

TECHNICAL FIELD

The present disclosure relates to a device for V2X communication and a data communication method, and more particularly, to a device discovery and authentication method between V2X communication devices.

BACKGROUND ART

In recent years, a vehicle has become a result of complex industrial technology, which is a fusion of electric, electronic, and communication technologies, centering on mechanical engineering and the vehicle is also called a smart car in such an aspect. A smart car has been providing various customized mobile services as well as traditional vehicle technology such as traffic safety/complicatedness by connecting drivers, vehicles, and transportation infrastructures. The connectivity may be implemented using vehicle to everything (V2X) communication technology. The system that provides the connectivity may be referred to as a connected vehicle system.

DISCLOSURE

Technical Problem

As vehicle connectivity is reinforced and increases, the amount and type of services targeted for V2X communication also increases. In addition, V2X communication must have low latency. That is, low latency is required to increase reliability and accuracy of messages. In contrast, channels are limited, and thus, an efficient V2X communication method is required.

Technical Solution

In an aspect, a data communication method of a V2X communication device includes transmitting a device discovery message, wherein the device discovery message includes a first authentication token for security authentication of the V2X communication device; receiving a discovery response message regarding the device discovery message from an external V2X communication device, wherein the discovery response message includes a second authentication token for security authentication of the external V2X communication device; and performing security authentication on the second authentication token included in the discovery response message.

The data communication method of a V2X communication device according to an embodiment of the present disclosure may further include: adding the second authentication token to a trust discovery list if security authentication of the second access token is successful, wherein the trust discovery list includes at least one of authentication token information available for security communication, V2X communication device information corresponding to the authentication token, and expiry time information of the authentication token information.

In the data communication method of a V2X communication device according to an embodiment of the present disclosure, the first authentication token and the second authentication token may each include expiry time information indicating an expiry time of an authentication token.

The data communication method of a V2X communication device according to an embodiment of the present disclosure may further include: transmitting the first authentication token request for discovery of the V2X device; and receiving the first authentication token.

In the data communication method of a V2X communication device according to an embodiment of the present disclosure, an authentication token may be deleted from the trust discovery list or a device discovery message for updating an expiry time of the authentication token may be transmitted to the external V2X device in a unicast manner, if the expiry time of the authentication token included in the trust discovery list arrives.

In the data communication method of a V2X communication device according to an embodiment of the present disclosure, the device discovery message may further include GeoNetwork information for Geo AdHoc routing.

In another aspect, a V2X communication device includes: a memory storing data; a radio frequency (RF) unit transmitting and receiving a wireless signal; and a processor controlling the RF unit, wherein the V2X communication device transmits a device discovery message and receives a discovery response message regarding the device discovery message from an external V2X communication device, wherein the device discovery message comprises a first authentication token for security authentication of the V2X communication device and the discovery response message comprises a second authentication token for security authentication of the external V2X communication device, and the V2X communication device performs security authentication on the second authentication token included in the discovery response message.

Advantageous Effects

The V2X device may communicate in various ways as well as broadcast by discovering other V2X devices within a communication range by the DDM/DRM communication protocol.

According to the present disclosure, the V2X device stores and operates a trust device discovery list (TDDL)/trust device AT list (TDAL), which is an authenticated trust list, thereby establishing a security session, without having to be connected to ITS-station discovery server (ISDS) and without an authentication each time.

The V2X device according to the present disclosure may perform device discovery even with a V2X device outside of the DSRC communication range by using GeoNetworking. An embodiment such as dynamic GeoNetworking discovery may be expanded by combining conditions such as priority and expiry time.

Hereinafter, the effects of the present disclosure will be further described together with the description of the configuration.

DESCRIPTION OF DRAWINGS

FIG. 11 illustrates a device discovery method according to an embodiment of the present disclosure.

FIG. 15 shows discoverer AT information and discovered AT information according to an embodiment of the present disclosure.

FIG. 16 illustrates discovery type information and request type information according to an embodiment of the present disclosure.

FIG. 18 shows an embodiment of (a) GeoNetwork basic header information and (b) GeoNetwork common header information included in GeoNetwork information.

FIG. 19 illustrates a device discovery method according to an embodiment of the present disclosure.

BEST MODE

Preferred embodiments of the present disclosure are described in detail and examples thereof are illustrated in the accompanying drawings. The following detailed description with reference to the accompanying drawings is intended to illustrate the preferred embodiments of the present disclosure rather than merely illustrating embodiments that may be implemented according to embodiments of the present disclosure. The following detailed description includes details to provide a thorough understanding of the present disclosure, but the present disclosure does not require all these details. In the present disclosure, respective embodiments described below need not be particularly used separately. Multiple embodiments or all embodiments may be together used, and specific embodiments may be used as a combination.

Most of the terms used in the present disclosure are selected from the general ones that are widely used in the field, but some terms are arbitrarily selected by the applicant and the meaning thereof will be described in detail in the following description as necessary. Accordingly, the invention should be understood based on the intended meaning of the term rather than the mere name or meaning of the term.

The present disclosure relates to a V2X communication device, and the V2X communication device may be included in an intelligent transportation system (ITS) system to perform all or some functions of the ITS system. The V2X communication device may allow communication between vehicles, a vehicle and an infrastructure, a vehicle and a bicycle, and mobile devices. The V2X communication device may be abbreviated as a V2X device. In an embodiment, the V2X device may correspond to an on board unit (OBU) of a vehicle or may be included in the OBU. The OBU may be referred to as on board Equipment (OBE). The V2X device may correspond to a road side unit (RSU) of an infrastructure or may be included in the RSU. The RSU may be referred to as roadside equipment (RSE). Alternatively, the V2X communication device may correspond to an ITS station or may be included in an ITS station. Any OBU, RSU and mobile equipment that perform V2X communication may all be referred to as an ITS station.

Figure 1:
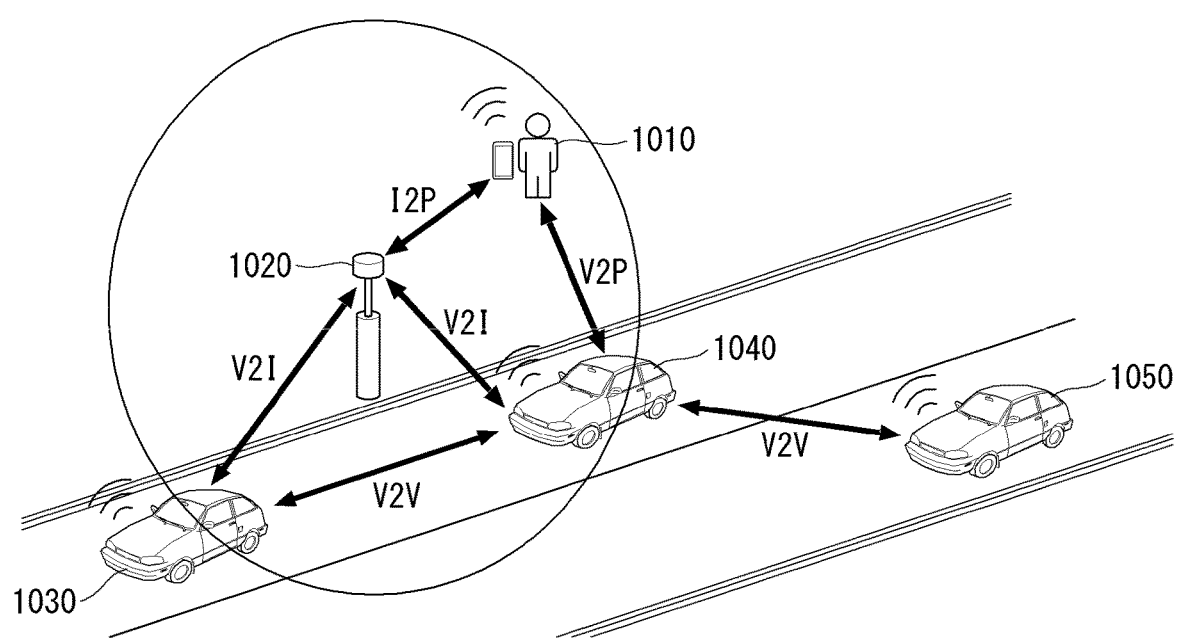
FIG. 1 shows an intelligent transportation system according to an embodiment of the present disclosure.

FIG. 1 illustrates an intelligent transportation system (ITS) according to an embodiment of the present disclosure.

A cooperative intelligent transportation system (C-ITS) increases efficiency of traffic operation management and improves user convenience and safety by adding information and communication, control, and electronic technologies to existing transportation systems. In the intelligent transportation systems, traffic infrastructure systems such as traffic lights and electronic display boards, as well as vehicles, perform V2X communication, and such infrastructure may be abbreviated as RSU as described above.

As shown in FIG. 1, in the intelligent transportation system, a pedestrian device 1010, an RSU 1020, and vehicles 1030, 1040, 1050 each including a V2X communication device communicate with each other. As an embodiment, V2X communication may be performed based on the communication technology of IEEE 802.11p. The communication technology based on IEEE 802.11p may also be referred to as dedicated short-range communication (DSRC). As an embodiment, V2X communication based on IEEE 802.11p may be a short-range communication technology in the range of about 600 m. The V2X communication device may broadcast a cooperative awareness message (CAM) or a decentralized environmental notification message (DENM).

The CAM is distributed from an ITS network and provides information on at least one of the presence, location, or communication status of an ITS station. The DENM provides information regarding a detected event. The DENM may provide information on a certain driving situation or event detected by the ITS station. For example, the DENM may provide information on situations such as vehicle accidents, vehicle problems, traffic conditions, and the like, such as emergency electronic brakes or the like.

In FIG. 1, the vehicle 1030 and the vehicle 1040 are within communication coverage of the RSU 1020. However, the vehicle 1050 is outside the communication coverage of the RSU 1020 and therefore cannot communicate directly with the RSU.

Figure 2:
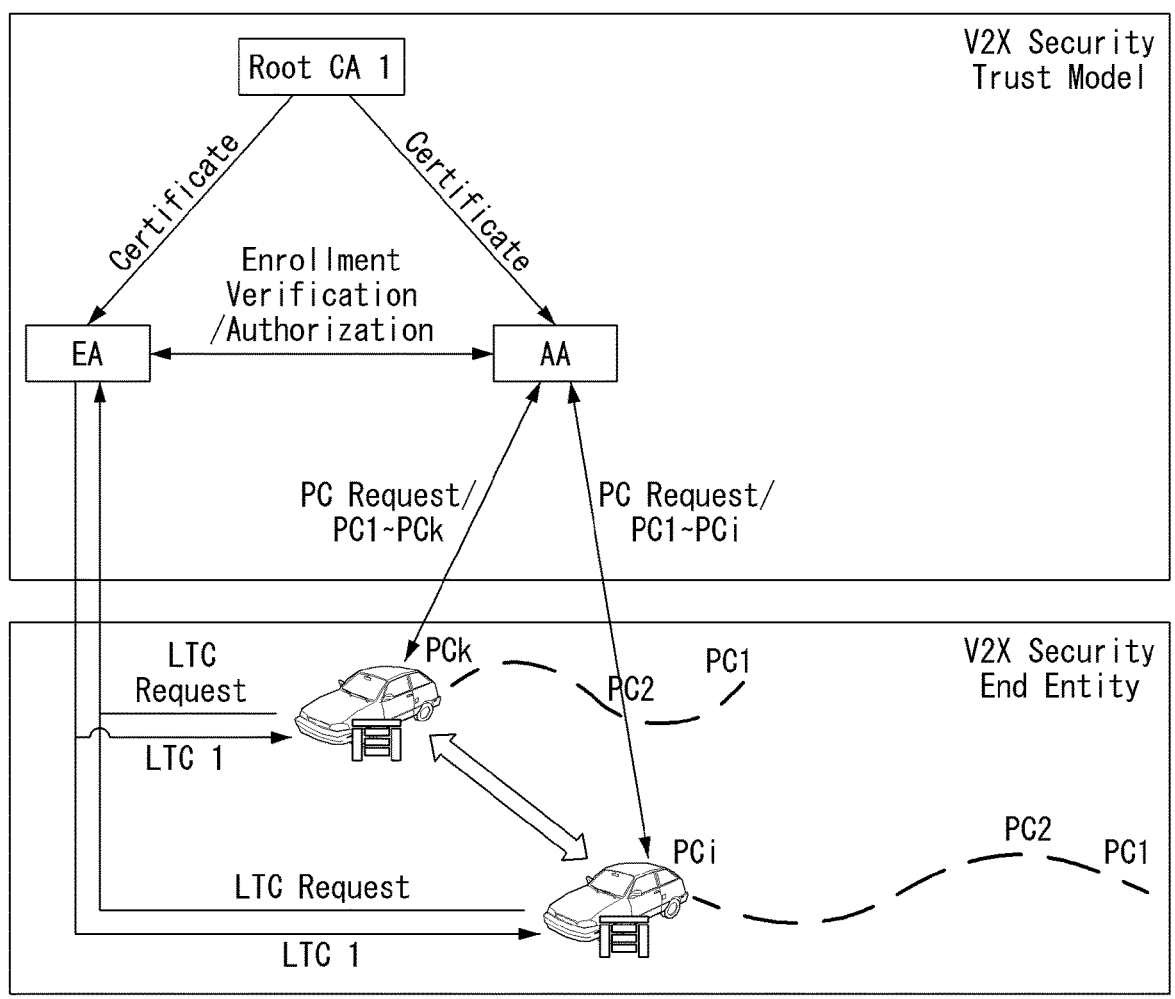
FIG. 2 illustrates a trust message communication method of a V2X communication system according to an embodiment of the present disclosure.

FIG. 2 illustrates a trust message communication method of a V2X communication system according to an embodiment of the present disclosure.

Whether to receive or process all messages broadcast in V2X communication is determined by a reception ITS station. Every ITS station has a long term certificate (LTC) for authenticating itself as shown in FIG. 2 and a pseudonum certificate (PC) for authenticating messages such as received CAM and DEMN for trust authentication.

Figure 3:
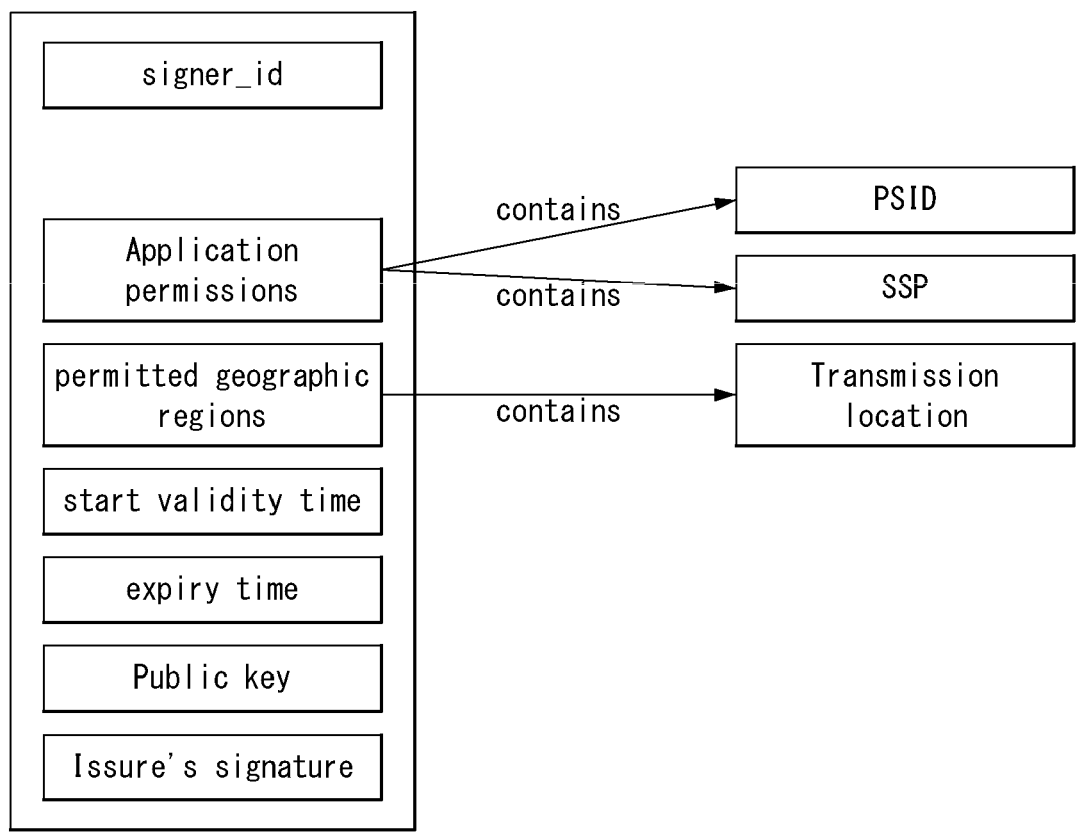
FIG. 3 illustrates a pseudonum certificate (PC) according to an embodiment of the present disclosure.

FIG. 3 shows the pseudonum certificate (PC) according to an embodiment of the present disclosure.

As shown in FIG. 3, the PC may include information such as a signer ID (signer_id), an application permission, a permitted geographic region, a start validity time, an expiry time, a public key, and issuer's signature. The application permission information may further include provider service ID (PSID) information and service specific permission (SSP) information, and the permitted geographic region information may further include transmission location information.

Figure 4:
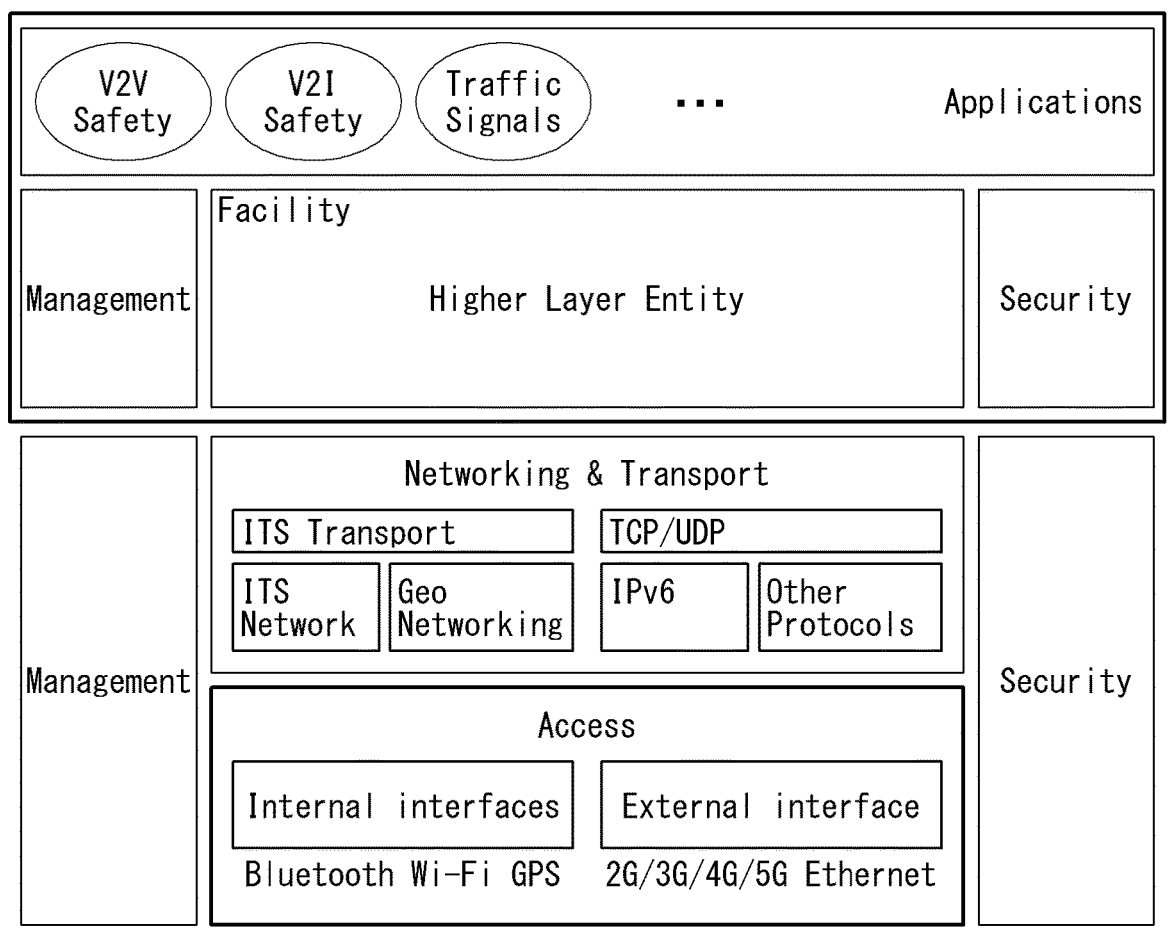
FIG. 4 illustrates a protocol stack of a V2X communication system according to an embodiment of the present disclosure.

FIG. 4 shows a protocol stack of a V2X communication system according to an embodiment of the present disclosure.

Each layer included in FIG. 4 is described as follows.

Application layer: The application layer may implement and support various use cases. For example, the application may provide road safety, efficient traffic information, and other application information.

Facility layer: The facility layer may support effective realization of various use cases defined in the application layer. For example, the facility layer may perform application support, information support, and session/communication support.

Networking & Transport layer: The networking & transport layer may form a network for vehicle communication between homogeneous/heterogenous networks by using various transport protocols and network protocols. For example, the networking/transport layer may provide Internet access and routing using Internet protocols such as TCP/UDP+IPv6. Alternatively, the networking & transport layer may configure a vehicle network using a geographical position-based protocol such as basic transport protocol (BTP)/GeoNetworking or the like.

Access layer: The access layer may transmit a message/data received from a higher layer through a physical channel. For example, the access layer may perform/support data communication on the basis of at least one of IEEE 802.11 and/or 802.11p specification-based communication technology, WIFI physical transmission technology of IEEE 802.11 and/or 802.11p specification, a DSRC technology, 2G/3G/4G(LTE)/5G wireless cellular communication technology including satellite/wideband wireless mobile communication, global positioning system (GPS) technology, Bluetooth, and IEEE 1609 WAVE technology.

The networking & transport layer may convey non-secured, signed, or encrypted information according to types of message or data. A message/data which is not a non-secured message/data, may pass through a security layer and may be controlled and processed by a management layer for communication.

Figure 5:
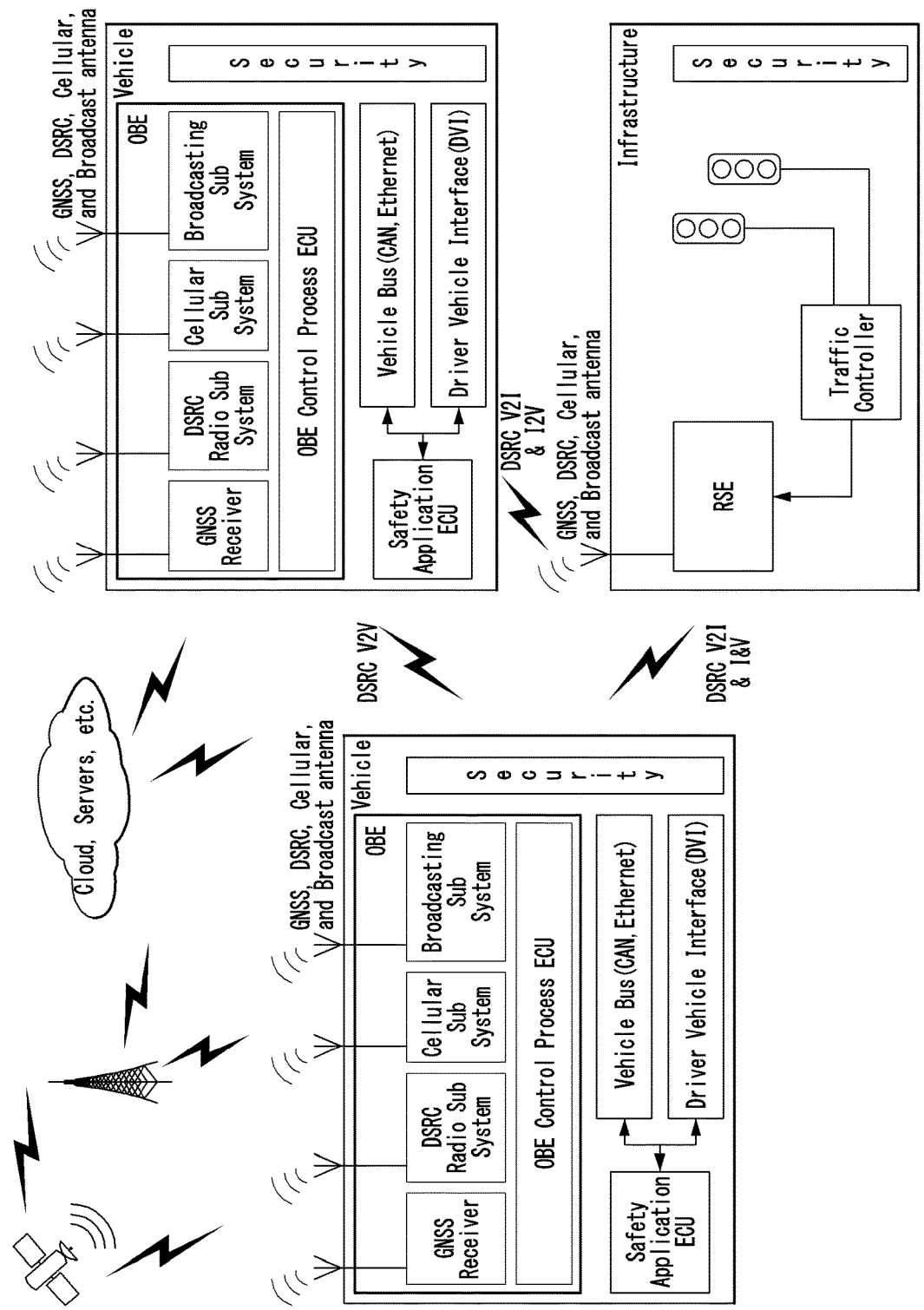
FIG. 5 illustrates communication between V2X communication devices according to an embodiment of the present disclosure.

FIG. 5 illustrates communication between V2X communication devices according to an embodiment of the present disclosure.

In a connected vehicle system, V2X communication devices such as a vehicle and an infrastructure may include a device configuration shown in FIG. 5. V2X communication devices may communicate with each other by using the system protocol shown in FIG. 4 for V2X communication.

In FIG. 5, a configuration included in a V2X communication device such as a vehicle is described as follows. The V2X communication device of FIG. 5 may include a plurality of antenna systems, and antenna system components may be integrated or separately provided or may be included as a combination thereof.

Global Navigation Satellite Systems (GNSS) system: A satellite positioning system for computing a position, an altitude and a velocity of an object moving around the globe using a radio wave emitted from an artificial satellite. This may correspond to an antenna or the sub system for identifying position information of a vehicle, included in the V2X communication apparatus of the vehicle.

Dedicated Short Range Communication (DSRC) Radio sub system: An antenna or the sub system for transmission/reception according to DSRC protocol.

Cellular Sub System: An antenna or the sub system for cellular data communication.

Broadcasting sub System: An antenna or the sub system for transmission/reception of broadcast data.

An on board equipment (OBE) control processor electronic control unit (ECU) may be abbreviated as a controller or a processor. The controller may process data messages received from multiple heterogeneous systems and perform an appropriate operation by controlling other ECUs in a vehicle. The controller may execute applications for the data processing and vehicle control/driving. The controller may also process sensing data received from other electronic equipment or sensors in the vehicle and transmit the processed sensing data to external V2X communication devices/vehicles. As an embodiment, all information in the vehicle may be converted into a standardized format that may be shared through a controller. As shown in FIG. 2, a safety application is executed to transmit and receive information to and from a bus in the vehicle such as CAN or Ethernet in the vehicle. Information may be provided to the user through a driver vehicle interface (DVI) such as an audio or display of the vehicle.

The V2X communication apparatus configured as such may communicate with an infrastructure, a pedestrian and a supporting system such as Cloud/Server as well as the other vehicle.

A Road Side Equipment (RSE) may receive information of a Traffic Controller and communicate with a vehicle. The RSE may be a fixed device and operate as a provider with being connected to a Backend. However, according to an embodiment, since the RSE may collect information from a vehicle and transmit it again, the RSE may operate as a user device as well as the provider device.

In a V2X communication system, V2X communication devices perform broadcasting-based communication. That is, since the V2X communication device selectively processes information received from all the surrounding ITS stations, a communication load increases as the number of ITS stations and services increases. In addition, the PC is a value that is continuously changed at regular intervals to ensure privacy. Therefore, in the case of using a PC for V2X communication by discovering an ITS station, if there is no ITS roadside (RS) station nearby, the V2X communication device cannot perform authentication and thus communication may be impossible. Even if there is a nearby ITS RS station, continuous additional authentication is required each time the PC changes during V2X communication.

Accordingly, the present disclosure proposes a device discovery technique for V2X communication. According to the present disclosure, the V2X device may communicate based on one of broadcast, unicast, and multicast according to types of ITS service by device discovery. Thus, it may provide secure and efficient V2X communication while reducing a conflict in a channel.

1) The present disclosure proposes a device discovery message (DDM)/device response message (DRM) communication protocol for device discovery. The DDM/DRM communication protocol allows V2X devices to communicate in various manners as well as broadcast by discovering other V2X devices within a communication range.

2) The present disclosure proposes an authentication technique for secure V2X communication that may overcome the shortcomings of a trust scheme through long term or PC operation. According to the present disclosure, the V2X device stores and operates a trust device discovery list (TDDL), which is an authenticated trust list, thereby establishing a security session without being connected to an ITS-station discovery server (ISDS) and authenticated each time. In this disclosure, a trust list may also be referred to as a trust device discovery list (TDDL), a trust discovery list (TDL), a trust access token (AT) list, or a trust device AT list (TDAL).

3) The present disclosure provides a technique for extending device discovery using GeoNetworking with various request conditions of a higher layer than a facility layer. The V2X device according to the present disclosure may perform device discovery with a V2X device outside a DSRC communication range by using GeoNetworking. By combining conditions such as priority and expiry time, it is possible to extend embodiments such as dynamic GeoNetworking discovery.

Figure 6:
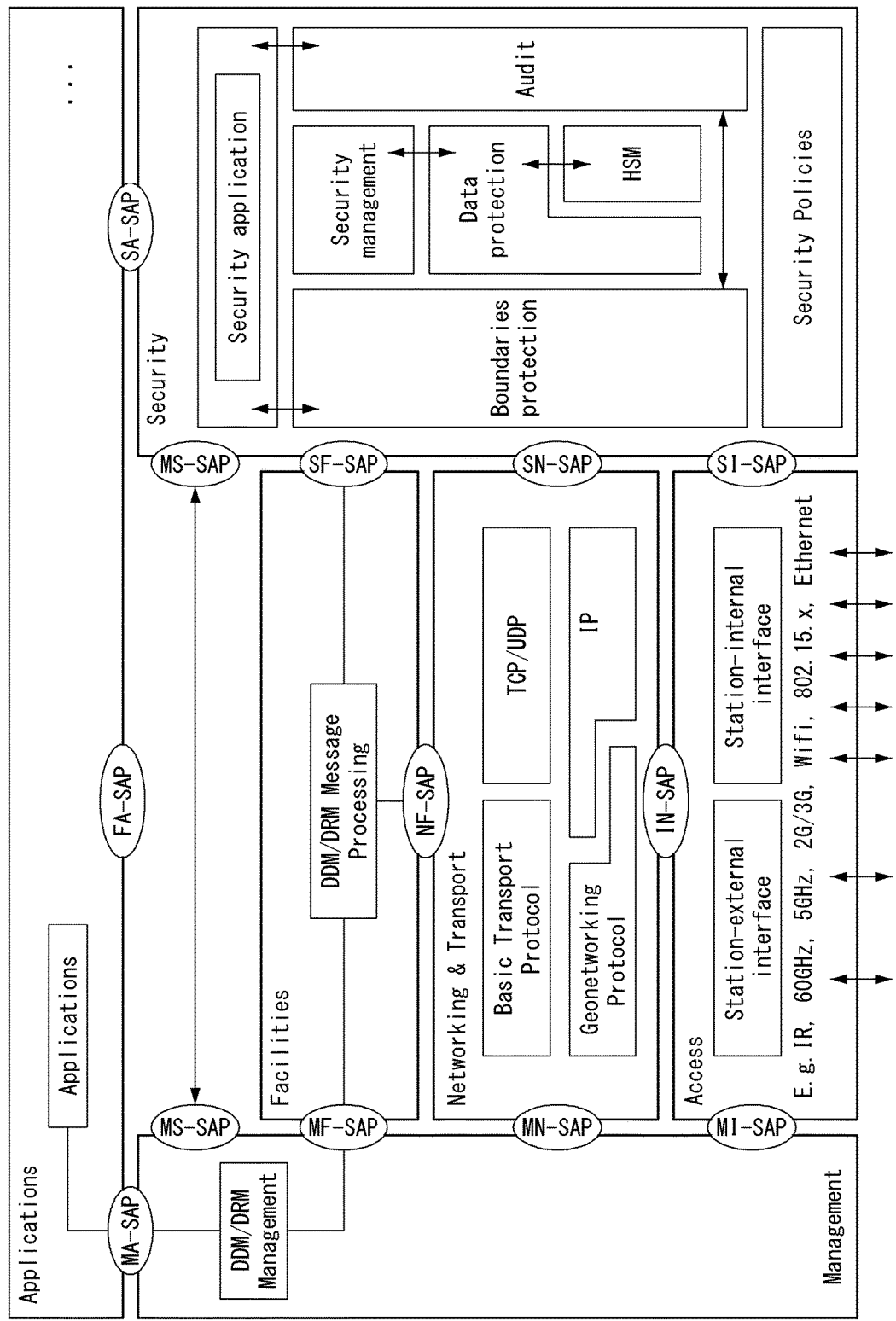
FIG. 6 illustrates a V2X communication architecture providing a DDM/DRM message protocol according to an embodiment of the present disclosure.

FIG. 6 shows a V2X communication architecture providing a DDM/DRM message protocol according to an embodiment of the present disclosure.

An application layer may request a DDM/DRM from the facility layer through MA-SAP. The facility layer may generate a message by performing DDM/DRM message processing. The generated DDM/DRM is delivered to the networking & transport layer. According to an embodiment, when security is required, the facility layer may deliver a signed message or an encrypted message.

The networking & transport layer may process the message and deliver it to the access layer. The access layer may transmit/receive the DDM/DRM based on the corresponding protocol.

Figure 7:
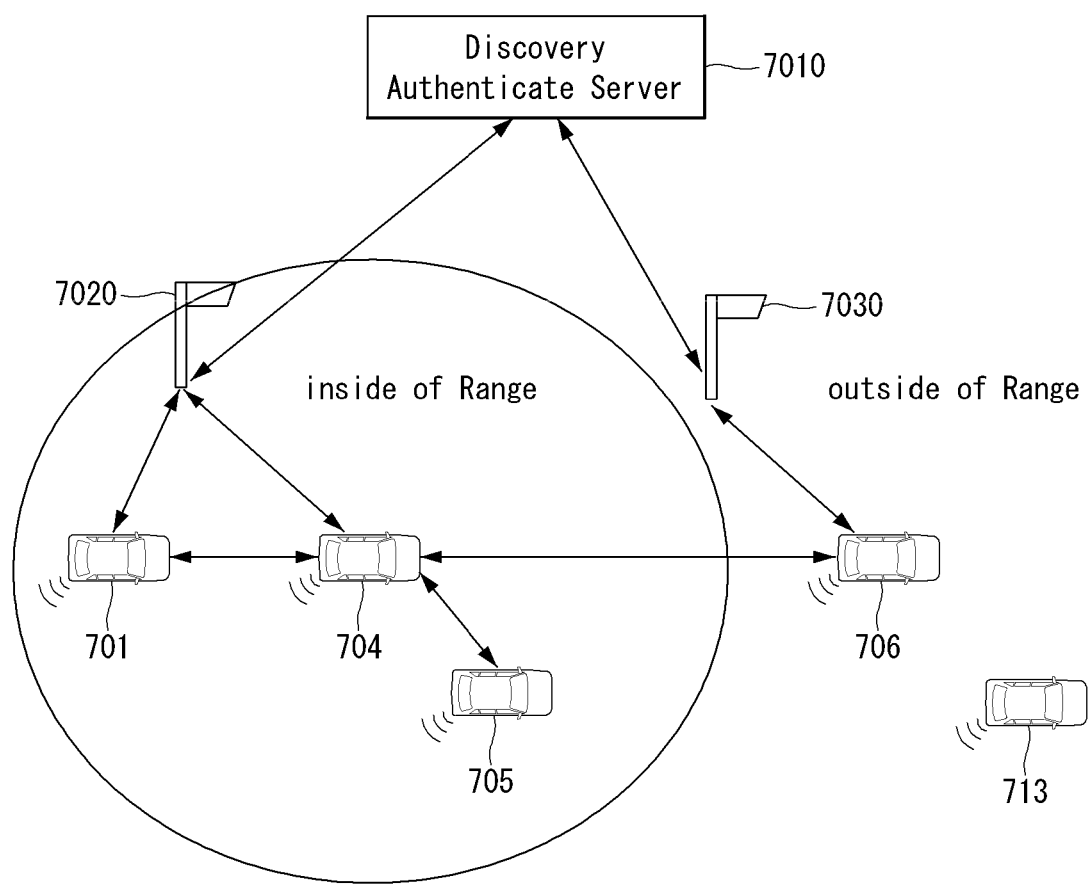
FIG. 7 illustrates V2X system operation according to a DDM/DRM protocol according to an embodiment of the present disclosure.

FIG. 7 illustrates a V2X system operation based on the DDM/DRM protocol according to an embodiment of the present disclosure.

The transmission protocol of the DDM/DRM will be described below based on whether the V2X device is within a communication range of the RSU. Hereinafter, the V2X device transmitting the DDM may be referred to as a Der (discoverer) and the V2X transmitting device receiving the DDM and transmitting the DRM in response thereto may be referred to as a Ded (discovered).

(1) When all of Der, Ded, and Auth are within Communication Range of RSU

All of the Der, Ded, and the Auth having authentication capability may be within the communication range of an RSU 7020. In the embodiment of FIG. 7, Der vehicle 701 and Ded vehicle 704 may be authenticated by RSU 7020 to discover each other and establish a security session.

(2) When One of Der and Ded is Outside Communication Range of Auth

Although the Der may discover the Ded, since one of the two is outside the communication range, a security session cannot be established and thus final discovery may fail. In the embodiment of FIG. 7, vehicle 704 and vehicle 705 try to discover each other, but the vehicle 705 is outside the communication range of RSU 7020 and cannot be authenticated for a security session.

(3) Both Der and Ded are within the Communication Range of Auth but Distance Therebetween is Outside Communication Range Although both the Der and the Ded have an RSU for authentication nearby, discovery may not be performed because a distance between the Der and the Ded is too far. In the embodiment of FIG. 7, the Der vehicle 704 and the Ded vehicle 706 may be authenticated from the RSU 7020 and the RSU 7030, respectively, but they are too far from each other to perform discovery.

(4) When Der, Ded, and Auth are all Outside Communication Range with Each Other.

The Der, Ded, and Auth may all be outside the communication range with each other. In the embodiment of FIG. 7, the vehicle 705, the vehicle 713, the RSU 7020, and the RSU 7030 cannot discover or authenticate each other.

Figure 8:
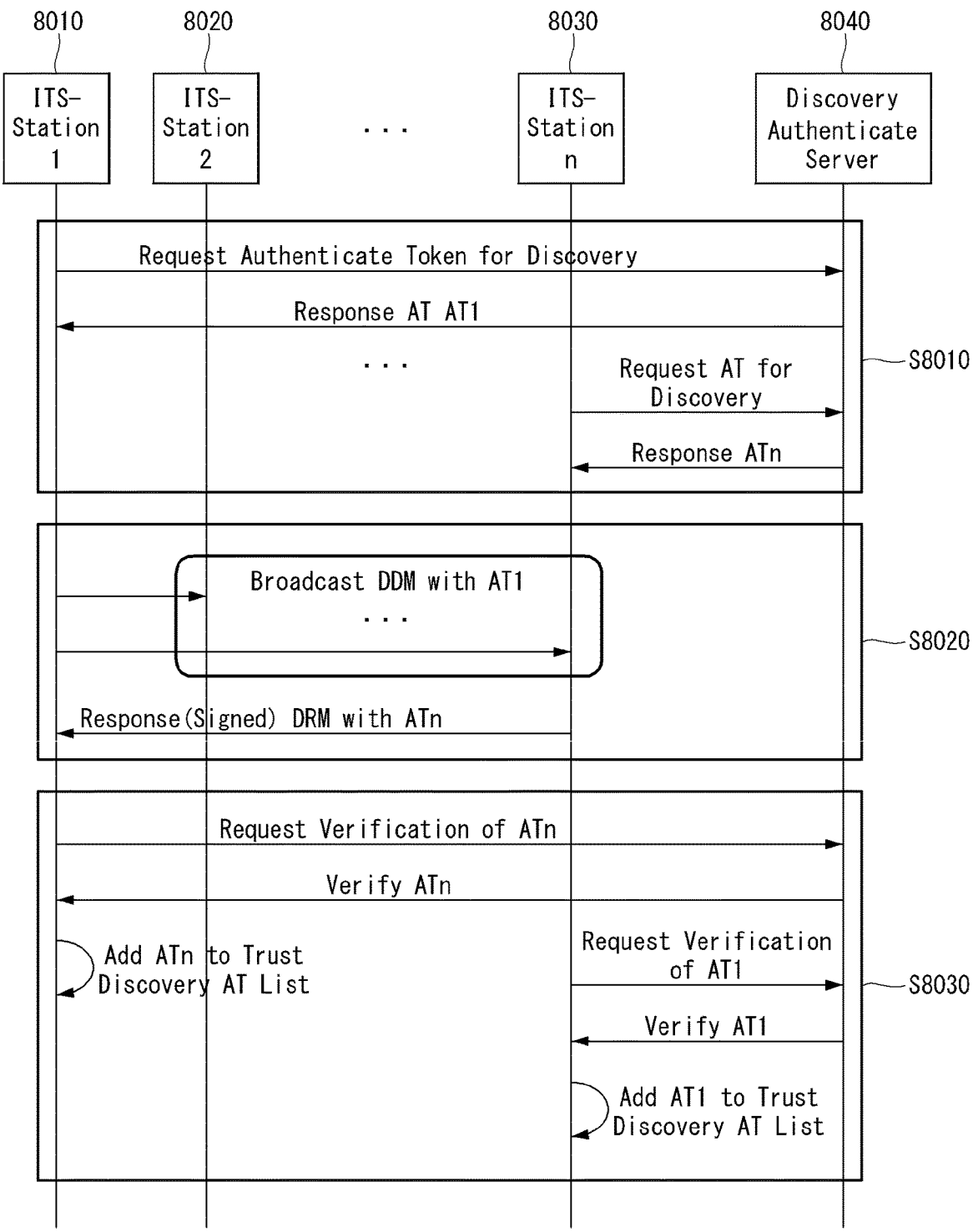
FIG. 8 illustrates a discovery and authentication method according to an embodiment of the present disclosure.

FIG. 8 illustrates a discovery and authentication method according to an embodiment of the present disclosure.

The discovery and authentication method of the ITS station may include receiving an authentication token (AT) (S8010), exchanging a DDM/DRM for discovery (S8020), and authenticating an ITS station which has exchanged the DDM/DRM (S8030). Each step will be described in detail below.

ITS stations 8010 to 8030 may transmit an authentication token request for discovery to a discovery authentication server 8040 and receive an authentication token in response thereto. In the embodiment of FIG. 8, the ITS station 8010 may receive a first authentication token AT1, and the ITS station 8030 may receive an nth authentication token ATn.

The discoverer ITS station 8010 may transmit a DDM including the first authentication token AT1. The ITS station 8010 may broadcast/multicast/unicast a DDM. As an embodiment, if the ITS station 8010 does not have a trust AT list, the ITS station receiving a response by broadcasting the DDM may be added to an AT list. If the ITS station 8010 has at least one trust AT list, it may transmit a DDM for at least one ITS station discovery in a multicast/unicast manner. In addition, the ITS station 8030 that receives the DDM from the ITS station 8010 may transmit a DRM including an authentication token ATn thereof. The ITS station 8030 may broadcast the DRM or transmit the DRM to the ITS station 8010.

The ITS stations that receive the authentication token of a counterpart through the exchange of DDM/DRM may authenticate the received authentication token of the counterpart. The ITS station 8010 may transmit a verification request for the authentication token ATn received from the ITS station 8030 to the discovery authentication server 8040. The discovery authentication server 8040 may transmit authentication of the authentication token to the ITS station 8010. If the authentication is successful, the ITS station 8010 may register/store the authentication token of the authenticated counterpart in a security region thereof.

The trust AT list may expire after a certain time. Before expiration, the ITS station may communicate with an ITS station included in the trust AT list any time without additional discovery authentication server access. Therefore, in case where the ITS station that has been authenticated is outside the coverage of the RSU, if the ITS station is included in the trust AT list, a security session may be established and communication may be performed.

By using the discovery and authentication method described above, the number of data transmissions may be significantly reduced according to the method of broadcasting all the data to all the peripheral ITS stations, and thus, conflict on a channel and a channel load may be reduced. Discovery of the present disclosure is performed in both directions and may be performed in one direction as needed. The trust AT list may be referred to as a trust discovery AT List (TDAL). The trust AT list may be stored in a management information base (MIB) or in a memory of the ITS station. In this disclosure, the memory may also be referred to as secure/non-secure storage.

Figure 9:
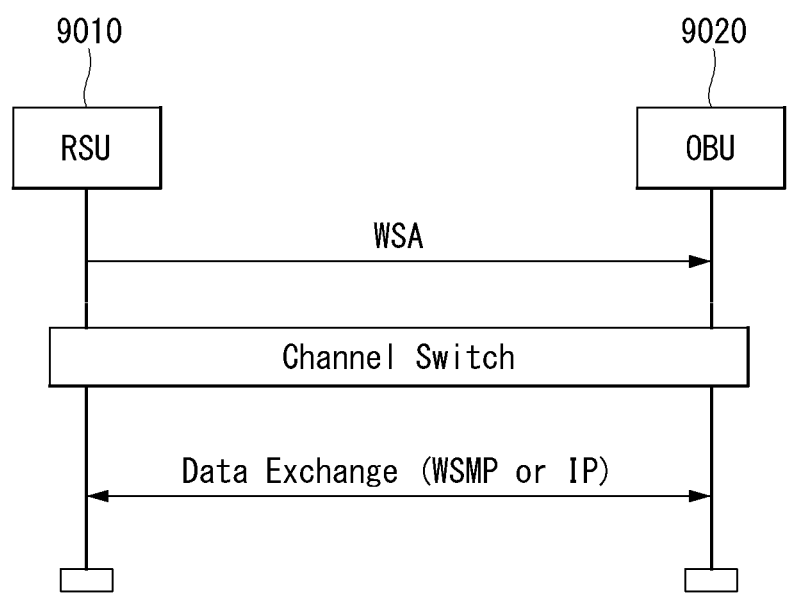
FIG. 9 illustrates a data communication method of a V2X device according to an embodiment of the present disclosure.

FIG. 9 illustrates a data communication method of a V2X device according to an embodiment of the present disclosure.

In FIG. 9, V2X devices are shown as an RSU and am OBU, respectively, but are not limited to this embodiment.

The RSU 9010 may transmit a message announcing a service such as a WAVE service advertisement (WSA). The OBU 9020 may monitor a channel and receive the WSA through the monitored channel. The WSA may include channel information on which a service is provided. The OBU may move to a channel indicated by the received WSA and perform data exchange. The data may be communicated via WAVE short message protocol (WSMP) or Internet protocol (IP). A channel through which the WSA is received may be referred to as a control channel, and a channel through which the service is provided may be referred to as a service channel. The WSA corresponds to an embodiment of the service advertisement information described above.

Figure 10:
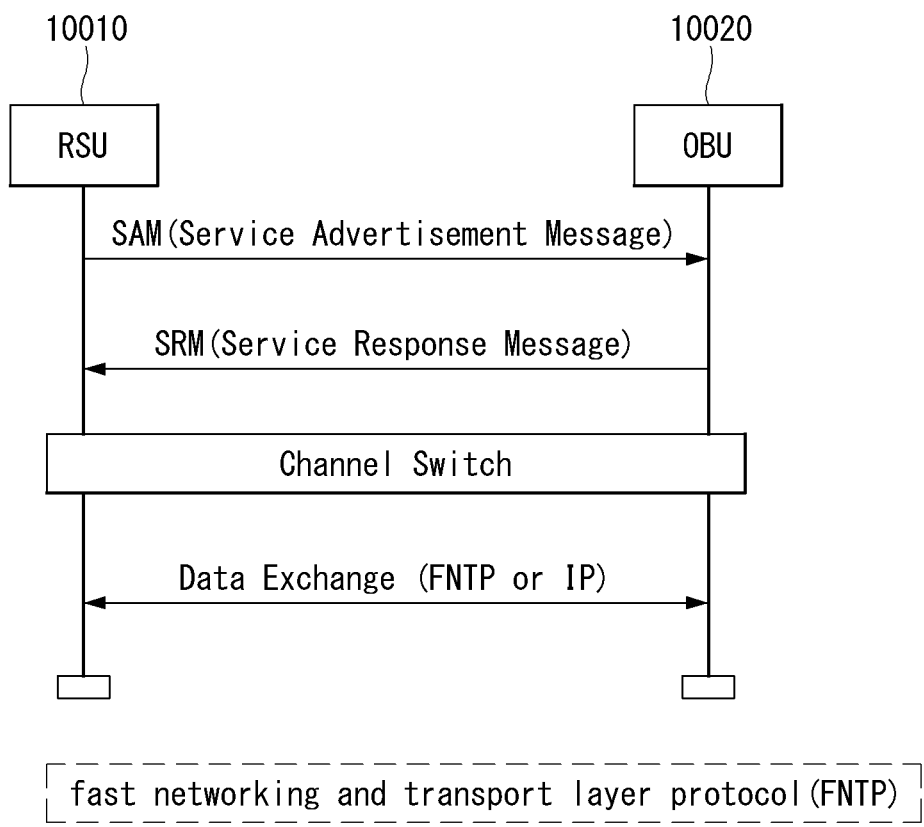
FIG. 10 shows a data communication method of a V2X device according to another embodiment of the present disclosure.

FIG. 10 illustrates a data communication method of a V2X device according to another embodiment of the present disclosure.

In FIG. 10, V2X devices are shown as RSU and OBU, respectively, but are not limited to this embodiment.

An RSU 10010 may transmit a message that declares a service such as a service advertisement message (SAM). An OBU 10020 may monitor a channel and receive the SAM through the monitored channel. The OBU 10020 may transmit a service response message (SRM). The SAM may include channel information on which a service is provided. The OBU may move to a channel indicated by the received SAM and perform data exchange. The data may be communicated via WAVE short message protocol (WSMP) or Internet protocol (IP). The SAM corresponds to an embodiment of the service advertisement information described above. Details of the SAM will be described later.

As an embodiment, the SRM may include the following fields.

Version: A 4-bit unsigned integer indicating a version of a service advertisement protocol.

Option selector: A 4-bit field indicating whether an option field exists. According to field values, whether at least one of an SRM extensions field, a private channel allocation request field, a context information field, or a private channel allocation confirm field exists may be indicated.

A header of the SRM may include a version field and an option select. The body of the SRM may include at least one of an SRM extensions field, a private channel allocation request field, a context information field, or a private channel allocation confirm field.

FIG. 11 illustrates a device discovery method according to an embodiment of the present disclosure.

The DDM may be included in the WSA/SAM described above with reference to FIGS. 9 to 10 or may be communicated separately from the WSA/SAM.

As shown in FIG. 11(a), the DDM may be included in the WSA. That is, Provider/User Discovery Request Primitive may be added based on WSA and SAM/SRM. In FIG. 11(a), the DDM may use an existing framework of the WSA and the SAM. However, Provider/User Discovery Request/Notification may be added to Primitive. A corresponding table may be added to the MIB.

As illustrated in FIG. 11(b), the DDM/DRM may include an optional WSA/SAM defined separately. That is, the DDM/DRM for discovery may be defined, and the WSA/SAM may be optionally included in DDM for scalability.

As shown in FIG. 11(c), DDM/DRM communication may be operated separately from WSA/SAM. WDM/SAM may be used when the DDM/DRM is defined for discovery and communication is performed with an ITS station where discovery is completed. Unlike the existing WSA/SAM, the DDM may be provided with a lighter concept of WSA/SAM that performs only discovery itself or finds and authenticates a nearby RSU for authentication after discovery. In contrast to the WSA being broadcast, the DDM may be designed to perform discovery and authentication only in a special case. Therefore, the WSA/RSM and the DDM may be allocated to separate time slots and operated by a separate access method.

Figures 12, 13:
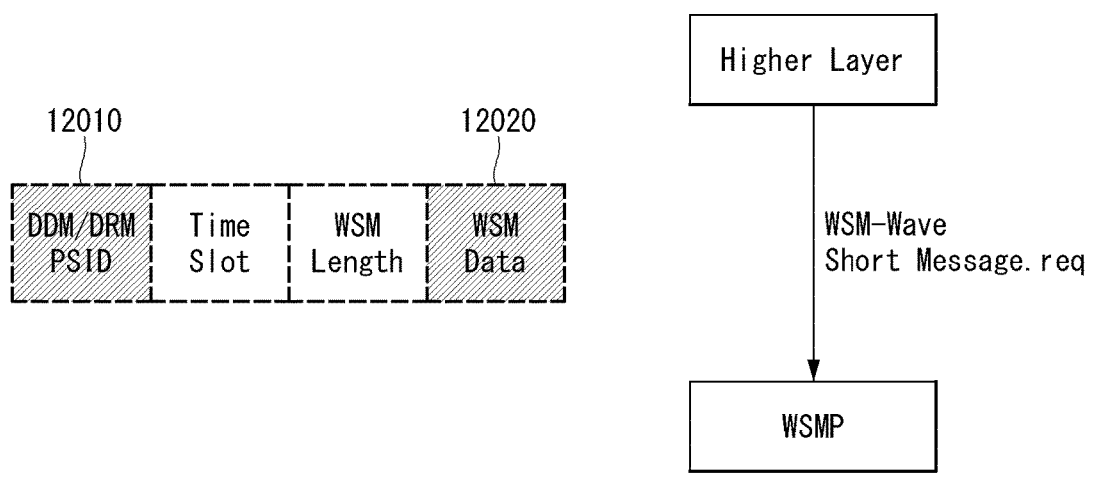
FIG. 12 illustrates a DDM/DRM processing method according to an embodiment of the present disclosure.
FIG. 13 illustrates AID/PSID for a device discovery service according to an embodiment of the present disclosure.

FIG. 12 shows a DDM/DRM processing method according to an embodiment of the present disclosure.

FIG. 12 illustrates a method of configuring a WSM at a higher layer to add the DDM/DRM to the WSM and transmit the same to the WSMP. A PSID for the DDM/DRM may be added to the WSM data. The PSID for the discovery service using the DDM/DRM may be defined as shown in FIG. 13.

FIG. 13 shows AID/PSID for device discovery service according to an embodiment of the present disclosure.

As shown in FIG. 13, by additionally defining a PSID for the DRM/DDM and adding the defined value to a header portion 12010 of the WSM data of FIG. 12, the value may indicate that corresponding WSM data 12020 is used for the DDM/DRM.

Figure 14:
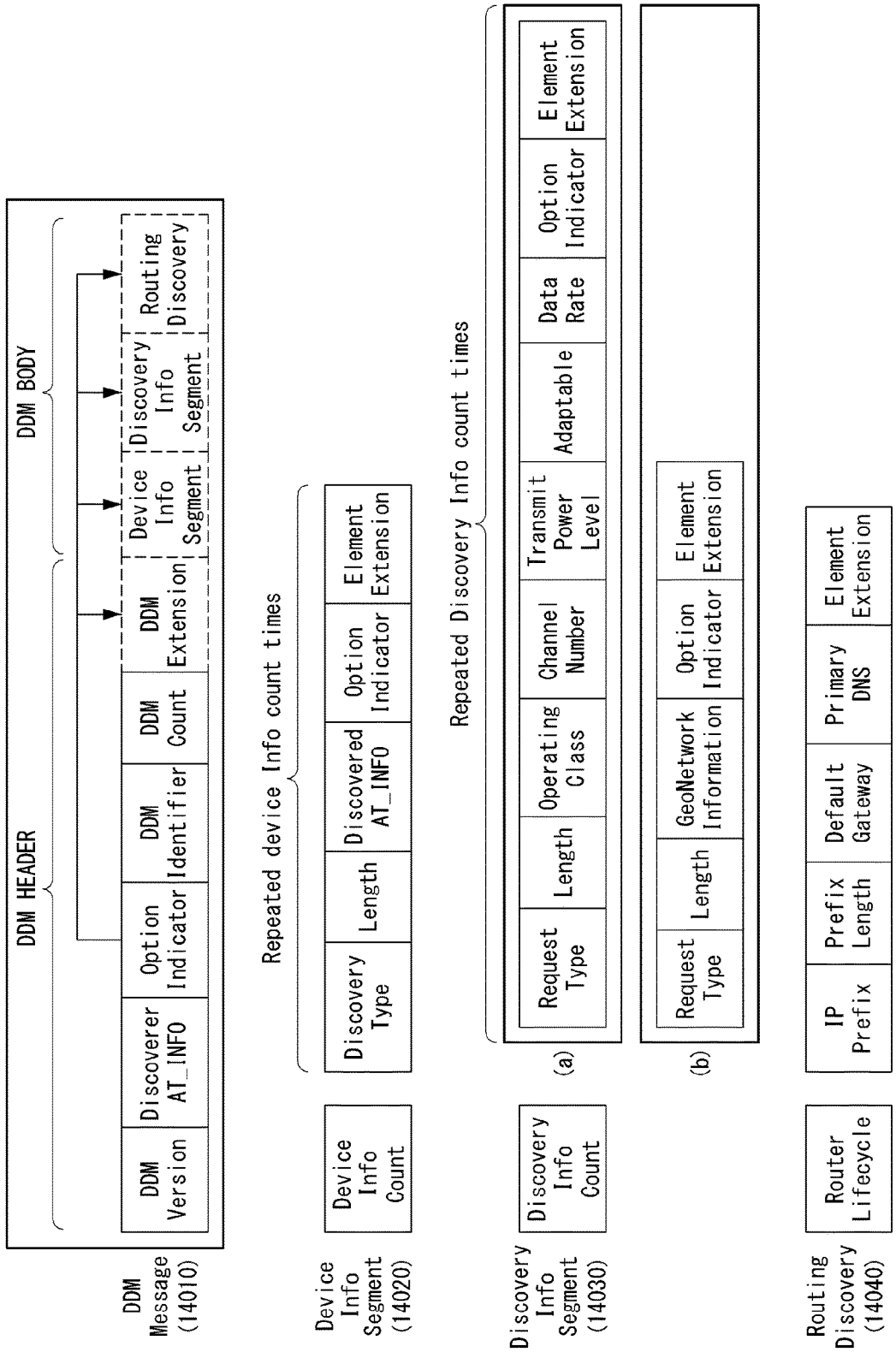
FIG. 14 shows a configuration of a WSM message for DDM/DRM according to an embodiment of the present disclosure.

FIG. 14 illustrates a configuration of a message for DDM/DRM according to an embodiment of the present disclosure.

FIG. 14 may indicate a DDM message or a DRM message. The DDM message of FIG. 14 may correspond to a configuration of a WSM message, that is, WSM data 12020 for the DDM/DRM shown in FIG. 12. A data structure and subfields/information included in FIG. 14 are as follows.

The DDM message 1410 includes a DDM header and a DDM body.

The DDM header may include at least one sub-information among a DDM version, a discoverer AT information, an option indicator, an DDM Indicator, a DDM count, and a DDM extension, a device info segment 14020, a discovery info segment 14030, and routing discovery 14040.

The device info segment 14020 may include at least one sub-information among a device info count, a discovery type, a length, discovered AT information, an option indicator, and an element extension.

The discovery info segment 1430a may include a discovery info count, a request type, a length, an operating class, a channel number, a transmit power level, and the like. It may include at least one sub-information of a transmit power level, an adaptable, a data rate, an option indicator, and an element extension. Alternatively, the discovery information segment 1430b may include at least one sub-information among a request type (Request), length, GeoNetwork information, an option indicator, and element extension.

The routing discovery information 14040 may include at least one sub-information among a router lifecycle, an IP prefix, a prefix length, a default gateway, a primary DNS, an element extension.

The sub-information included in the DDM message is as follows.

DDM version: It indicates a DDM version, and when a DDM having an unsupported DDM version is received, the V2X device may not process the DDM.

DDM option indicator: It indicates whether DDM Extension, DDM Info Segment, Discovery Info Segment, and Routing Discovery exist by I/O.

DDM Identifier: It may have a value of 0 to 15 and is used to identify a unique DDM.

DDM Count: It may have a value of 0 to 15 and may be used to determine whether the DDM is a repetition of a previous DDM having the same DDM Identifier at the receiving side.

DDM Extension: This field may be optionally included for future scalability.

Device Info Segment: As an optional field, it may not be included in the DDM transmission when there is no device added to the TDAL in the MIB of the ITS station or when a new device other than the TDAL is intended to be discovered. The device information segment may provide device information added to the TDAL. Thus, ITS stations may receive information on trusted stations collected by other ITS stations, so that information on more trusted stations may be obtained even with a small number of times.

Discovery info segment: The discovery information is an optional field/segment. If the discovery information does not exist, it may be a case where a device within a DSRC range in which a discoverer does not exist is found, and in this case, discovery information may not be separately provided.

The discovery info segment 1430 may be referred to as discovery information. The discovery info segment may be configured in two forms as shown in FIG. 14 according to discovery request types.

A first type of discovery info segment 1430(*a*) indicates information when discovery is performed on ITS stations within 1-hop communication range, and the second type of discovery info segment 1430(*b*) indicates information when discovery is performed on ITS stations outside the 1-hop communication range. The second type of discovery info segment 14030(*b*) includes GeoNetwork information, so that the DDM message may be delivered even to ITS stations outside the 1-hop communication range.

In the case of GeoNetworking, the ITS station may perform discovery without device info segments by Geo-Broadcast or GeoUnicast. Alternatively, the ITS station may search for or discover a specific device by combining at least one of the TDAL information by GeoMulticast or GeoUnicast.

An expiration time of the discovered AT information is an expiration time of a corresponding AT. When the expiration time of the discovered AT elapses, the ITS station may delete the discovered AT information from the TDAL list. In the case of continuously managing the TDAL list, the ITS station may transmit a new AT Option together with a request type of discovery information when requesting the DDM. Upon receiving the new AT request information, the discovered station may send the newly authenticated AT in the DRM. The ITS station may store its AT information in the MIB. The ITS station may be discovered and transmit the DRM, and when a specific service is successfully terminated on the basis of the transmitted DRM, the ITS station may increase a TC value. If the received DDM requests AT reissue, the ITS station may reject AT reissue if its TC value is above a certain value. That is, the ITS station may disregard the AT reissue if it has much time until its AT is terminated or a trust class is high, even though the request type information included in the received DDM includes new AT option information.

Routing Discovery: This field provides information required for performing discovery using a mechanism such as WSA routed over IPv6.

FIG. 15 shows discovery AT information and discovered AT information according to an embodiment of the present disclosure.

In the embodiment of FIG. 15(*a*), Discoverer AT information (Discoverer AT_INFO) may include at least one of the following sub-information.

AT: Authentication Token (AT) Information of discoverer
Expiration Time: It indicates an expiration time of the AT
Reserved field: Included for future use In the embodiment of FIG. 15(*b*), the discovered AT information may include at least one of the following sub-information.

AT: Discovered Authentication Token (AT) Information
Expiry Time Information: It indicates an expiration time of the AT.

TC: It indicates a Trust Class (TC) of a device. As an embodiment, a value of the TC may be increased based on the number of times the same AT is connected within an AT validity period. When the TC value reaches a maximum value, the maximum value may be maintained even if the same AT is received. TC value may be deleted together when the corresponding device is deleted from the TDAL.

Nick Name: Nick name information indicates a nickname of a device.

Priority: Priority information indicates priority of DDM.
Reserved field: Included for future use.

In the case of using the AT, the PC of FIG. 3 may be used by increasing only the expiration time. However, the PC of FIG. 3 may have a configuration with more messages and complexity of calculation may be increased. In contrast, the authentication token may include a smaller amount of data, such as 32 bytes as an embodiment. In addition, the authentication token method is used during a mid-term, so that region dependency is reduced and a permitted geographic region information of the PC is also unnecessary, further reducing the amount of data. Therefore, the discovery protocol may be performed more effectively by using the smaller amount of data and the token method with less complexity than the PC.

The authentication token does not contain personal information. The authentication token is only exposed briefly when it is broadcast for discovery, and privacy may be enhanced since the ITS station performs communication based on the TDL after discovery. In particular, more efficient communication is possible than a PC with a very short validity period. The authentication token corresponds to mid-term random trust authentication compared to the PC. As an embodiment, the validity period of the authentication token may correspond to several hours to days or weeks.

In an embodiment, the discoverer AT information of FIG. 15(*a*) may further include nickname information. Such discoverer AT information may also be used in discovered AT information. That is, in the discovered AT information of FIG. 15(*b*), priority information and trust class information are stored in the memory, such as the MIB, and include the discovered authentication token (AT) information, expiration time information, and nickname information.

FIG. 16 shows discovery type information and request type information according to an embodiment of the present disclosure.

As shown in FIG. 14, the DDM may include at least one of discovery type information or request type information.

As shown in FIG. 16, the discovery type information may be discoverer only, discoverer and service announcement, reserved discovery, one time discovery, or continuous discovery. The discovery type information may be type information in which a corresponding device is discovered and registered in the TDAL. That is, the TDAL may store/include authenticated authentication token information and discovery type information of the device corresponding to the authentication token.

When performing discovery by adding an additional option, the ITS station may request by putting a field in an optional extension of discovery information. As an embodiment, an option such as a temporal condition may be added to the extension field. That is, an option may be added, such as whether to discover immediately, make a reservation only, discover only once, or discover continuously with a timeout.

As shown in FIG. 16, request type information may indicate a discovery option such as default DSRC, GeoNetwork, GeoNetwork in case of DSRC failure, or cellular. Based on the request type information, the ITS station may discover a target station within a communication range or using GeoNetwork/IPv6.

Figure 17:
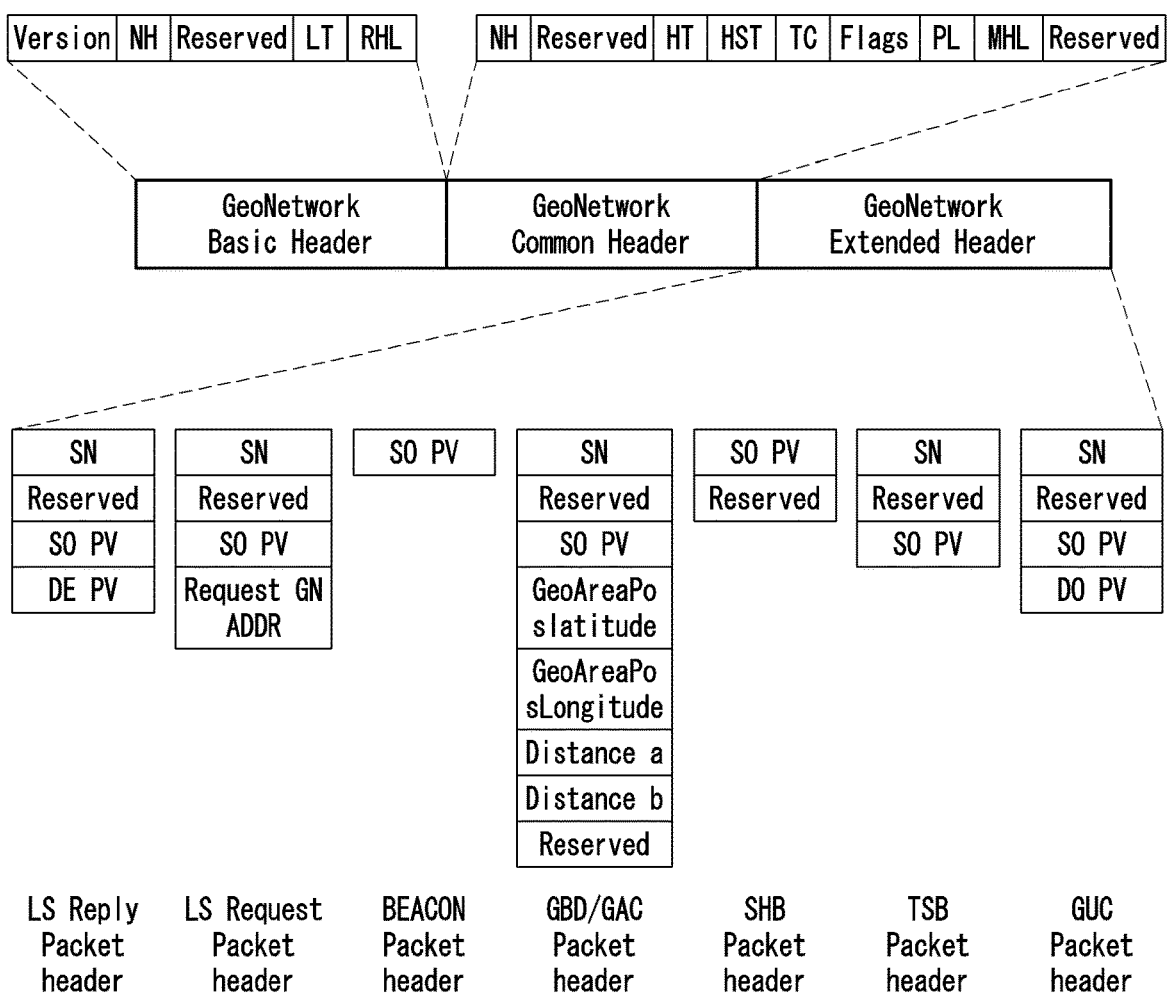
FIG. 17 illustrates GeoNetwork information according to an embodiment of the present disclosure.

FIG. 17 shows GeoNetwork information according to an embodiment of the present disclosure.

In FIG. 14, GeoNetwork information may be included in a discovery info segment.

The GeoNetwork information may include at least one of a GeoNetwork Basic Header, a GeoNetwork Common Header, and a GeoNetwork Extended Header.

The GeoNetwork information includes information for Geo Adhoc routing.

FIG. 18 shows an embodiment of (a) GeoNetwork basic header information and (b) GeoNetwork common header information included in GeoNetwork information.

As the DDM message may include GeoNetwork information, the ITS station may discover an ITS station outside a single hop or a DSRC range.

FIG. 19 illustrates a device discovery method according to an embodiment of the present disclosure.

In FIG. 19, the discoverer represents an ITS station or V2X communication device transmitting a DDM.

In FIG. 19(a), the discoverer may broadcast a DDM. Thus, the discoverer may discover a certain device in the DSRC region. When the discoverer receives the DRM and the AT is authenticated through a nearby RSU, the device is registered in the TDL of the discoverer. The two ITS stations may then establish a security session within an AT expiration time and perform unicast communication with each other. The two ITS stations may also perform multicast communication.

In FIG. 19(b), the discoverer may unicast the DDM to a specific device. This is a case where discovery has been made beforehand. That is, the discoverer may additionally transmit the DDM to a previously discovered device to update AT or initiate communication such as service provision. In this case, the discoverer may transmit the DDM to a specific device included in the TDL in a unicast manner.

FIGS. 19(c) and 19(d) show an embodiment in which the discoverer transmits a DDM by geo-unicast and geo-broadcast. As described above, the ITS station may combine the trust class and the request type and send a multi-hop DDM by using geo-broadcast if discovery fails in single-hop communication.

Figure 20:
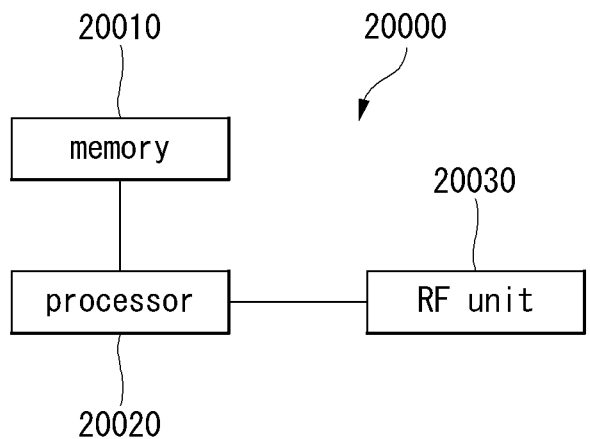
FIG. 20 shows a V2X communication device according to an embodiment of the present disclosure.

FIG. 20 illustrates a V2X communication device according to an embodiment of the present disclosure.

FIG. 20 is a block diagram of a V2X communication device according to an embodiment of the present disclosure.

In FIG. 20, the V2X communication device 20000 may include a memory 20010, a processor 20020, and an RF unit 20030. As described above, the V2X communication device may correspond to an OBU or an RSU or may be included in the OBU or the RSU. The V2X communication device may be included in an ITS station or may correspond to the ITS station.

The RF unit 20030 may be connected to the processor 20020 to transmit/receive a radio signal. The RF unit 20030 may up-convert data received from the processor 20020 into a transmission/reception band to transmit a signal. The RF unit may implement an operation of an access layer. As an embodiment, the RF unit may implement an operation of a physical layer included in the access layer or may further implement an operation of a MAC layer. The RF unit may include a plurality of sub-RF units for communication in accordance with a plurality of communication protocols.

The processor 20020 may be connected to the RF unit 20030 to implement operations of layers according to an ITS system or a WAVE system. The processor 20020 may be configured to perform an operation according to various embodiments of the present disclosure based on the drawings described above and descriptions. In addition, at least one of a module, data, a program, or software for implementing the operation of the V2X communication device 20000 according to various embodiments of the present disclosure described above may be stored in the memory 20010 and executed by the processor 20020.

The memory 20010 is connected to the processor 20020 and stores various information for driving the processor 20020. The memory 20010 may be included in the processor 20020 or may be installed outside the processor 20020 and connected to the processor 20020 by a known means. The memory may include a secure/non-secure storage or may be included in the secure/non-secure storage. According to an embodiment, the memory may be referred to as a secure/non-secure storage.

A detailed configuration of the V2X communication device 20000 of FIG. 20 may be implemented such that the various embodiments of the present disclosure described above are applied independently or two or more embodiments are applied in combination. A data communication method of the V2X communication device 20000 of FIG. 20 according to an embodiment of the present disclosure will be described below.

Figure 21:
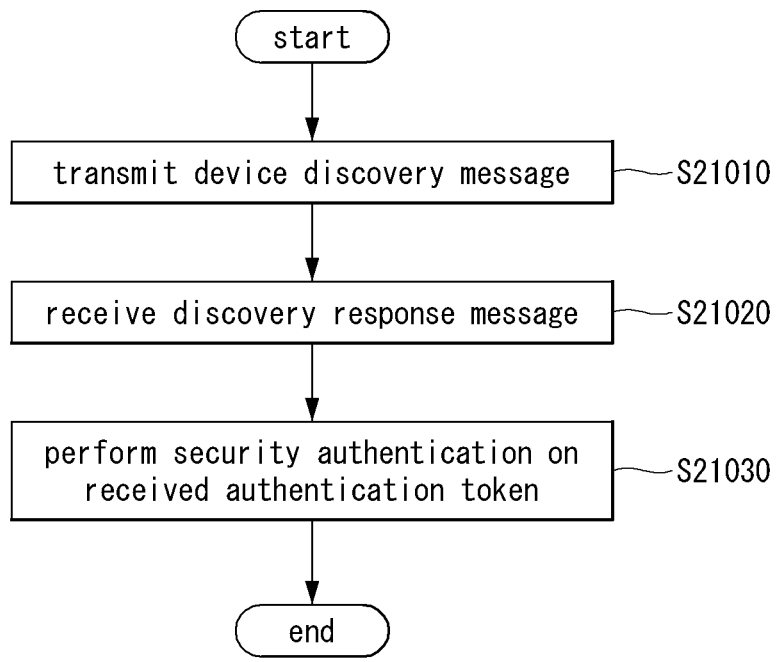
FIG. 21 illustrates a communication method of a V2X communication device according to an embodiment of the present disclosure.

FIG. 21 illustrates a communication method of a V2X communication device according to an embodiment of the present disclosure.

In particular, FIG. 21 illustrates a discovery method of a V2X communication device according to an embodiment of the present disclosure.

The V2X communication device may transmit a device discovery message (S21010). The V2X communication device may broadcast the DDM described above. The V2X communication device may use GeoNetworking, while broadcasting the DDM. The DDM may include an authentication token for security authentication of the V2X communication device. The DDM may be configured as in the embodiment of FIGS. 14 and 16.

The V2X communication device may receive a discovery response message (S21020). The V2X communication device may receive the above-described DRM from an external V2X communication device in response to the DDM. The DRM may include an authentication token of an external V2X communication device. The V2X communication device may process the received DRM to obtain an authentication token.

The V2X communication device may perform security authentication on the received authentication token (S21030). The V2X communication device may transmit a security authentication request for the received authentication token to an authentication-enabled device such as an RSU and receive security authentication. As an embodiment, if it is determined that the received authentication token is an already security-authenticated token, the security authentication process may be omitted.

If the security authentication of the received authentication token is successful, the V2X communication device may add the received authentication token to the trust discovery list. The trust discovery list may be stored in the memory of the V2X device. The trust discovery list may include at least one of authentication token information enabling secure communication, V2X communication device information corresponding to the authentication token, and expiration time information of the authentication token information. The authentication information may be configured as in the embodiment of FIG. 15. In addition, the trust discovery list may include at least one of authentication token information enabling secure communication, V2X communication device information corresponding to the authentication token, expiration time information of the authentication token information, and priority information of the authentication token information.

The V2X communication device includes an authentication token, which should be provided for its discovery, in a DDM and transmits the same. To this end, the V2X communication device may transmit an authentication token request for its discovery to a security server and receive the authentication token.

When the expiration time of the authentication token included in the trust discovery list arrives, the V2X communication device may delete the authentication token from the trust discovery list or sends a device discovery message for updating the expiration time of the authentication token to the external V2X device in a unicast manner.

The device discovery message may further include GeoNetwork information for Geo AdHoc routing. The V2X communication device receiving the DDM including the GeoNetwork information may route the DDM to another V2X communication device based on the GeoNetwork information. The GeoNetwork information for Geo AdHoc routing, such as a routing period and a routing distance, is as described above with reference to FIGS. 17 and 18.

In the data communication method of the V2X communication device according to an embodiment of the present disclosure, even if the expiration time of the authentication token included in the trust discovery list does not arrive, a device discovery message for re-issuance of the authentication token may be sent in a unicast or multicast manner to an external V2X device, and a receiver may disregard it according to its own policy, such as its status or request priority. As an embodiment, the V2X communication device may have a new AT authenticated when trust of devices included in the TDAL list is suspicious or before important information is transmitted. The V2X communication device may send an AT update request for a response after a new AT is authenticated. The AT update request may be included in the DDM. The discoverer may request the AT updating after deleting existing ATs from the TDAL. The discoverer responds with a new AT, thereby configuring a new TDAL including a new AT.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

It is understood by those skilled in the art that various changes and modifications may be made in the present invention without departing from the spirit or scope of the invention. Therefore, it is intended that the present invention cover the modifications and variations of this invention provided within the scope of the appended claims and their equivalents.

Reference is made herein to both apparatus and method inventions and descriptions of both apparatus and method inventions may be complementary to one another.

Various embodiments have been described in the best mode for carrying out the invention.

INDUSTRIAL APPLICABILITY

The present invention is used in a series of smart car/connected field or a V2X communication field.

It is apparent to those skilled in the art that various changes and modifications can be made in the present invention without departing from the spirit or scope of the invention. Therefore, it is intended that the present invention cover the modifications and variations of this invention provided they come within the scope of the appended claims and their equivalents.

The invention claimed is:

1. A data communication method of a vehicle-to-everything (V2X) communication device, the data communication method comprising:
   receiving, from a discovery authentication server, a first authentication token (AT) for security authentication of the V2X communication device;
   transmitting, to an external V2X communication device, a device discovery message based on an WAVE short message (WSM), wherein the device discovery message comprises the first AT;
   receiving, from the external V2X communication device, a discovery response message regarding the device discovery message, wherein the discovery response message comprises a second AT of the external V2X communication device for the security authentication;
   performing the security authentication on the second AT included in the discovery response message, with the discovery authentication server; and
   adding the second AT of the external V2X communication device to a trust device authentication token list (TDAL) of the V2X communication device, based on the security authentication on the second AT.

2. The method of claim 1, wherein based on the second AT of the external V2X communication device being added to the TDAL, a device discovery on the external V2X communication device is performed by using Discovered AT_INFO generated based on the TDAL.

3. The method of claim 2, wherein the device discovery message comprises a Identification for the device discovery message, a first time slot field, a first Length field, a data field related to the device discovery message, and a field of the Discovered AT_INFO.

4. The method of claim 2, wherein the Discovered AT_INFO comprises (i) the second AT of the external V2X communication device, (ii) expiry time information indicating an expiry time of the second AT of the external V2X communication device, (iii) information regarding a trust class (TC) indicating a number of connections based on the second AT of the external V2X communication device, (iv) information regarding a nickname of the external V2X communication device, and (v) information regarding a priority of the second AT of the external V2X communication device.

5. The method of claim 1, further comprising:
   receiving, from the external V2X communication device, a specific device discovery message requesting an AT of the external V2X communication device to be reissued; and
   determining whether to reissue the AT of the external V2X communication device based on a value of trust class stored in the V2X communication device.

6. The method of claim 5, wherein the value of the trust class increases based on a specific service being successfully terminated.

7. The data communication method of claim 1,
   wherein the second AT is added to the TDAL based on the security authentication on the second AT being successful, and
   wherein the TDAL comprises at least one of AT information available for security communication, V2X communication device information corresponding to the AT, or expiry time information of the AT information.

8. The data communication method of claim 1, wherein each of the first AT and the second AT comprise expiry time information indicating an expiry time of an authentication token.

9. The data communication method of claim 8, wherein an AT is deleted from TDAL or a specific device discovery message for updating an expiry time of the AT is transmitted to the external V2X communication device in a unicast manner, based on expiration of the expiry time of the AT included in the TDAL.

10. The data communication method of claim 1, further comprising:
    transmitting, to the discovery authentication server, a first AT request for discovery on the external V2X communication device; and
    receiving, from the discovery authentication server, the first AT.

11. The data communication method of claim 1, wherein the device discovery message further comprises GeoNetwork information for Geo AdHoc routing.

12. A V2X communication device comprising:
    a radio frequency (RF) unit configured to transmit and receive a wireless signal;
    a processor configured to control the RF unit; and
    a memory connected to the processor and storing instructions that, based on being executed by the processor, control the V2X communication device perform operations comprising:
    receiving, from a discovery authentication server, a first authentication token (AT) of the V2X communication device for security authentication;
    transmitting, to an external V2X communication device, a device discovery message based on an WAVE Short Message (WSM), wherein the device discovery message comprises the first AT;
    receiving, from the external V2X communication device, a discovery response message regarding the device discovery message, wherein the discovery response message comprises a second AT of the external V2X communication device for the security authentication;
    performing the security authentication on the second AT included in the discovery response message with the discovery authentication server; and
    adding the second AT of the external V2X communication device to a trust device authentication token list (TDAL) of the V2X communication device, based on the security authentication on the second AT.

13. The V2X communication device of claim 12, wherein the second AT is added to the TDAL based on the security authentication on the second AT being successful, and
    wherein the TDAL comprises at least one of AT information available for security communication, V2X communication device information corresponding to the AT, or expiry time information of the AT information.

14. The V2X communication device of claim 13, wherein the each of the first AT and the second AT comprise expiry time information indicating an expiry time of an authentication token.

15. The V2X communication device of claim 12, wherein the operations further comprise:
   transmitting, to the discovery authentication server, a first AT request for the device discovery on the external V2X communication device, and
   receiving, from the discovery authentication server, the first AT.

16. The V2X communication device of claim 13, wherein an AT is deleted from the TDAL or a specific device discovery message for updating an expiry time of the AT is transmitted to the external V2X communication device in a unicast manner, based on expiration of the expiry time of the AT included in the TDAL.

17. The V2X communication device of claim 12, wherein the device discovery message further comprises GeoNetwork information for Geo AdHoc routing.

\* \* \* \* \*